United States Patent [19]

Jennings

[11] Patent Number: 4,747,606
[45] Date of Patent: May 31, 1988

[54] BI-DIRECTIONAL METAL-TO-METAL SEAL

[75] Inventor: Charles E. Jennings, Agoura Hills, Calif.

[73] Assignee: Vetco Gray Inc., Houston, Tex.

[21] Appl. No.: 32,939

[22] Filed: Mar. 27, 1987

Related U.S. Application Data

[63] Continuation of Ser. No. 778,813, Sep. 23, 1985, abandoned.

[51] Int. Cl.⁴ .................. F16J 15/02; F16L 17/02; F16L 39/00
[52] U.S. Cl. .................. 277/182; 277/183; 277/184; 277/208; 277/214; 277/236; 285/108; 285/110; 285/137.1; 285/917
[58] Field of Search ............... 277/236, 212 R, 212 C, 277/207 H, 208, 209, 210, 152, 167.3, 184, 189, 182, 183, 214; 285/108, 109, 110, 111, 112, 113, 99, 917, 137.1, 379; 92/243, 242, 246

[56] References Cited

U.S. PATENT DOCUMENTS

| | | | |
|---|---|---|---|
| 1,139,396 | 5/1915 | Barthel | 92/242 X |
| 1,830,937 | 11/1931 | Falkenstein | 92/246 X |
| 2,474,564 | 6/1949 | Zoromskis | 92/246 X |
| 2,772,931 | 12/1956 | Biedermann | 92/243 X |
| 2,915,348 | 12/1959 | Arnold et al. | 92/246 X |
| 3,352,212 | 11/1967 | Read | 92/242 X |
| 3,493,147 | 2/1970 | Ballin | 92/243 X |
| 3,563,557 | 2/1971 | Doutt | 92/243 X |
| 4,075,935 | 2/1978 | Panigati | 92/243 |

Primary Examiner—Allan N. Shoap
Attorney, Agent, or Firm—Joseph R. Dwyer

[57] ABSTRACT

A bi-directional metal-to-metal seal (10) comprising a ring with a pair of oppositely acting sealing elements (20 or 22) integral with the outer periphery of the ring. In one embodiment, two pairs of such sealing elements (20 and 22) are located on each end of the ring (as viewed in cross section) and are of a thickness to be resilient (springy) and deflectable when inserted in an interference fit relationship into a cylindrical wall or bore to be sealed. The first sealing element (24) has a curved outer surface (26) and with an opening (30) facing the main flow path of pressure fluid. The curved outer surface rolls inward against the cylindrical wall (42) while being inserted into the cylinder, partially closing the opening (30) but still allowing the pressure fluid to enter and urge the curved surface against the cylindrical wall. The second sealing element (32) also has a curved outer surface (36) and is of a thickness to be flexible and springy and likewise deflectable (rollable) into the cylindrical surface (26) in an interference fit relationship. The second sealing element (32) has a wall (34) which is open towards a second fluid under pressure so that the seal elements are operable in two directions. The latter sealing elements are similar but oppositely arranged for sealing against leakage between the two pairs and in either direction of flow through the pipe or flow path. In the embodiment having two pairs of bi-directional seal elements, there is a center area (16) of larger diameter than the sealing elements (20 and 22) for retention in a retainer (52) so that a cluster of such seals can be retained as an assembly of seals.

7 Claims, 4 Drawing Sheets

BI-DIRECTIONAL METAL-TO-METAL SEAL

This is a continuation, of application Ser. No. 778,813, filed 09/23/85, now abandoned.

BACKGROUND OF THE INVENTION

This invention relates to metal-to-metal seals for sealing joints of pipe and the like against leakage and is particularly directed to a bi-directional metal-to-metal seal for sealing such joints against leakage in the event a reversal of flow of the fluid under pressure occurs in the flow path. This invention is also directed to the use of a plurality of such seals as a cluster of seals held in a retainer as an assembly so that the entire assembly of seals may be installed or removed at the same time. The latter assembly is especially useful in flowline connections in the oil and gas industry.

The use of metal-to-metal seals for sealing joints of pipe and the like against leakage of various types is old. See, for example, the fire-resistant metal-to-metal seal as disclosed in the U.S. Pat. No. 4,471,965 to Jennings, et al, and especially those having pressure-responsive lips such as shown in the U.S. Pat. Nos. 2,405,152 to Kitchenmann; 3,455,562 to Burtis; the French Patent No. 1,356,218 of the Cadillac Gage Company; and the U. K. Patent Application No. 2,000,234A of Panigati; all of which were sited in the Jennings, et al, patent.

None of the foregoing seals, however, were effective to seal a flow path in two directions in the event of a reversal of the flow of fluid under pressure in the flow path. Also, none of the patents disclosed a metal-to-metal seal which could be inserted and removed without galling or scoring the sealing surface which the seal engaged, nor do any of the patents disclose an assembly of a cluster of seals which may be installed or removed all at the same time. As it will be apparent to those skilled in the art, the use of such an assembly is particularly advantageous in installing and removing multiple seals used in flowline connectors where a plurality of flowlines (individual pipe lines) terminate at a common point to be connected, usually below the surface of the water in subsea well systems.

SUMMARY OF THE INVENTION

The bi-directional metal-to-metal seal of this invention comprises a ring (cylindrical sleeve), having a bore of substantially the same diameter of the pipe or flow path to be sealed, with a pair of oppositely acting sealing elements located on, and integral with, the outer periphery of the ring. In one embodiment, two pairs of such sealing elements are located on each end of the ring (as viewed in cross section) and are of a thickness to be resilient (springy) and deflectable when inserted in an interference fit relationship into a cylindrical wall or bore to be sealed. The first or outer of the sealing elements is curved somewhat cylindrical with a curved outer surface and with an opening facing the main flow path of pressure fluid. The curved outer surface rolls inward against the cylindrical wall while being inserted into the cylinder, closing the opening but still allowing the pressure fluid to enter and urge the curved surface against the cylindrical wall. The second or inner sealing element of the same pair of sealing elements also has a curved outer surface and is of a thickness to be flexible and springy and likewise deflectable (rollable) into the cylindrical surface in an interference fit relationship. The second sealing element has a surface which is open towards opposite direction from the first sealing element and towards a second fluid under pressure so that the sealing elements are operable in two directions. In the embodiment having two pairs of sealing elements, the sealing elements are similar but oppositely arranged for sealing against leakage, between the two pairs and in either direction of flow through the pipe or flow path.

In the embodiment having two pairs of bi-directional sealing elements, there is a center area of larger diameter than the sealing elements for retention in a retainer so that a cluster of such seals can be retained as an assembly of seals. The retainer itself is provided with a peripheral metallic seal which also rolls when inserted into a cylinder in an interference fit relationship to energize the seal in intimate contact with the cylindrical wall. This latter seal comprises a pair of semi-cylindrical sealing elements with curved outer surfaces and openings which are open to fluid which will urge the sealing elements into closer contact in the cylindrical wall on response to fluid pressure. Thus, an assembly comprising a plurality of bi-directional ring seals and a bi-directional peripheral seal may be inserted as a unit between flowline terminals comprising a plurality of flow paths such as used in connecting a subsea well to a production tree.

It will be apparent to those skilled in the art that the rolling action of the sealing elements against the cylindrical wall allows entry and withdrawal of the bi-directional seal without scoring or galling, thereby allowing the seal to be used more than once without further machining of either the seal or the cylindrical surface.

DETAILED DESCRIPTION

Figure 1:
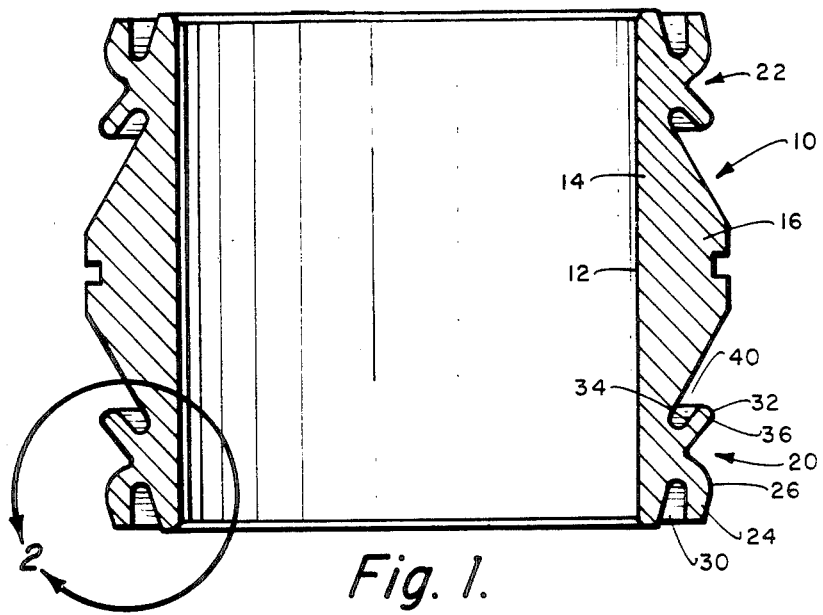
FIG. 1 is a cross-sectional view of the ring having pairs of sealing elements with each pair forming the bi-directional seal of this invention.

In the cross-sectional view of the two pair embodiment of the bi-directional metal-to-metal seal 10, as shown in FIG. 1, it can be seen that this embodiment comprises a ring having a bore 12 of the diameter of the pipe or flow path to be sealed. The ring comprises a base 14 having, in cross-section, a thick central portion 16 for resistance against external pressure and a pair of sealing elements 20 and 22 at each end. Both pairs of sealing elements are integral with the base 14 and formed to be springy (deflectable). The first, or outer, sealing element 24 of one pair, comprises a relatively thin walled curved semi-cylinder with a curved outer surface 26 and a central cavity 30 opening towards path of flow of fluid.

The second or inner sealing element 32 of the pair 20 is essentially a straight, angularly disposed, wall 34 with a curved outer surface 36 and with the central portion 16 defining a cavity 40 opening in the opposite direction from cavity 30, i.e., towards the center of the ring so as to be actuated by the leakage of fluid flowing from the opposite direction from the fluid flowing into the first cavity 30 of another seal. The element 32 is also formed to be springy (deflectable).

As can be seen, the other pair of sealing elements 22 are identical but oriented to operate in the opposite direction. The reference numerals applied to pair 22 are the same as those applied to the pair 20 since their function is the same but oppositely acting.

Figure 2:
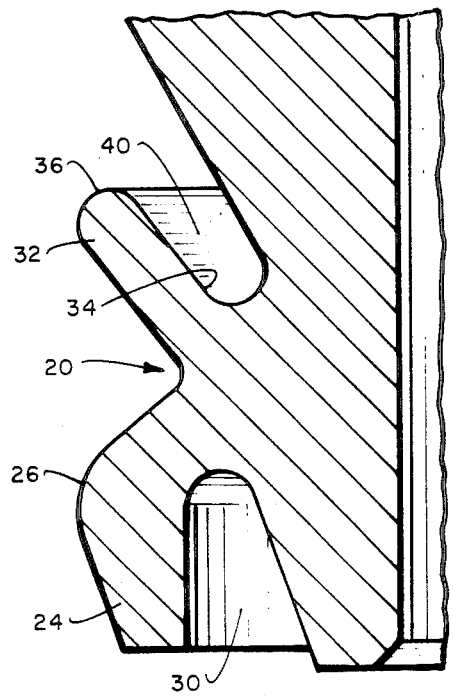
FIG. 2 is a view of the bi-directional seal in enlarged over that shown in FIG. 1 in the area of the arrow 2.
Figure 3:
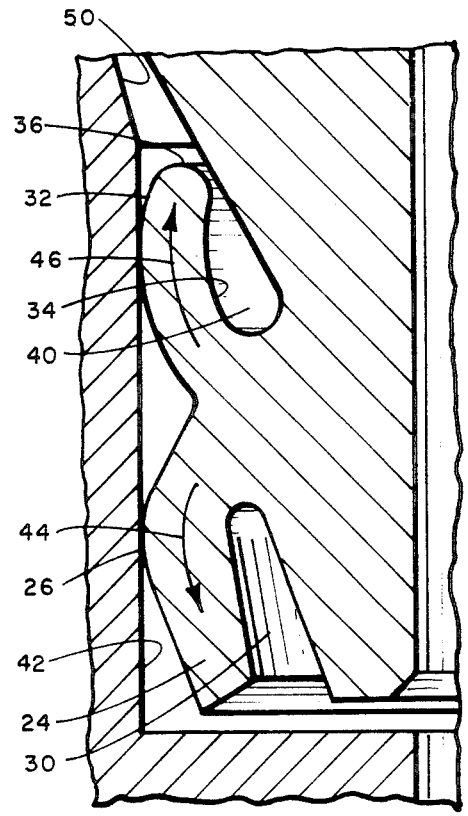
FIG. 3 is a view of the seal of FIG. 2 showing the rolling reaction of the sealing elements when inserted in a cylindrical bore.

The element to be sealed, whether a termination of a flowline or a pipe is itself provided with a cylindrical surface shown as a counterbore 42 of slightly less diameter than the outer diameter of the sealing elements at their outermost curved surfaces 26 and 36, so that when the elements are inserted into the counterbore an interference fit exists and the sealing elements deflect (energized). As shown in the enlargement of pair 20 in FIGS. 2 and 3, there is a slight curved inward deflection (roll) of the sealing elements in the direction indicated by the arrows 44 and 46. As also shown in FIG. 3, the counterbore 42 is provided with a conical outer guide surface 50 to facilitate insertion. The amount of rolling deflection of the elements is exaggerated in FIG. 3 to illustrate the energizing of the sealing elements but, as shown, the openings 30 and 40 remain open to pressure fluid to be also energized thereby. The sealing elements may be inserted and withdrawn for the counterbore without scoring or galling of either surface and this is attributed to the deflection and rolling phenomenon.

Figure 5:
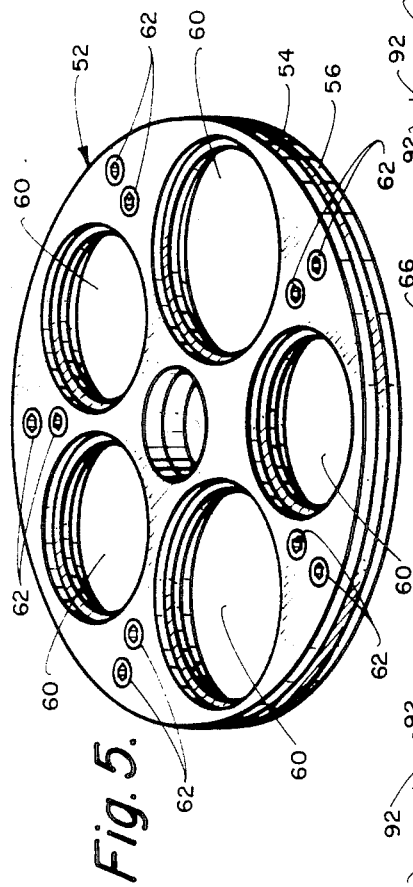
FIG. 5 is a perspective view of a retainer for a cluster of such bi-directional seals as an assembly so that a plurality of flowlines may be sealed or the seals removed all at the same time.
Figure 4:
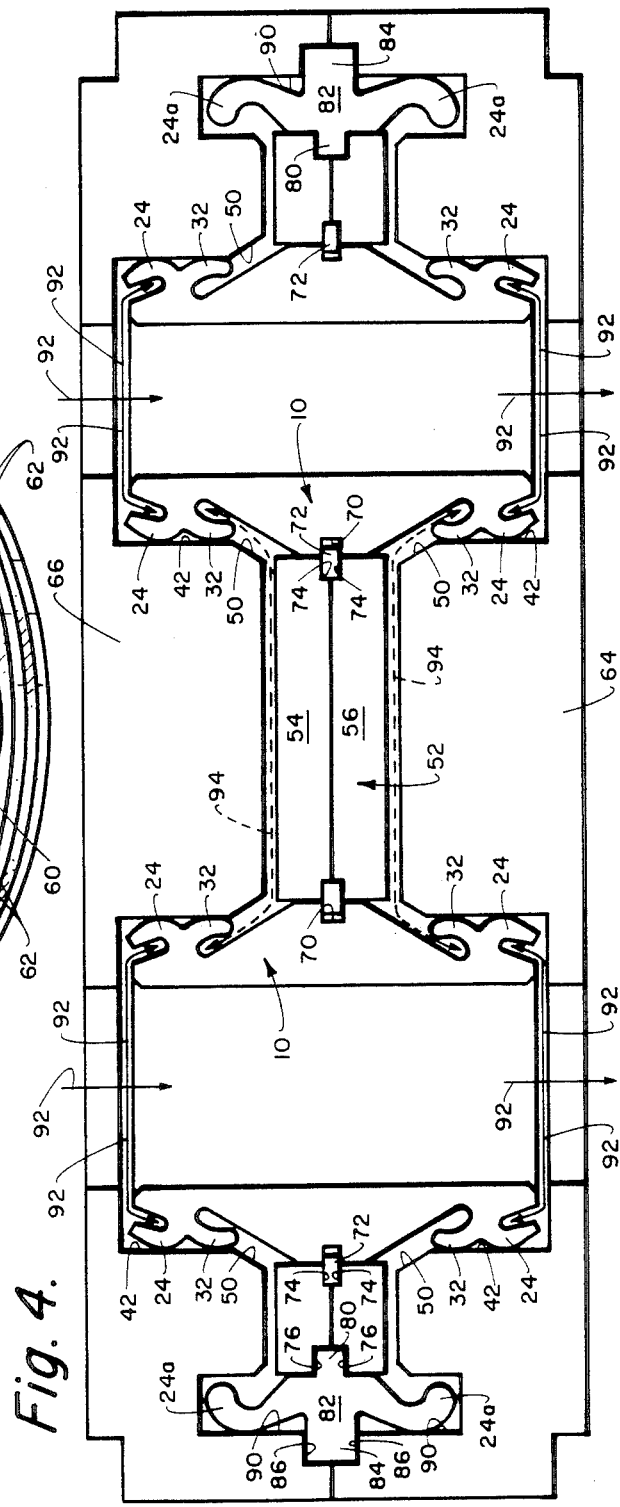
FIG. 4 illustrates a pair of such bi-directional seals in an arrangement where the concept of sealing in both directions is illustrated together with the peripheral seal.

FIG. 4 is a schematic illustration of the cluster of seals assembled in a retainer 52 as shown in FIG. 5. This retainer 52 is a pair of plates 54 and 56 with a plurality of bores 60 which correspond in number and size to the flowlines and held together by any suitable means, such as bolts 62. The arrangement of the retainer is shown more clearly in FIG. 4 but for simplicity only two seals10 and two flowlines are shown. Thus, while FIG. 4 is schematic, both FIGS. 4 and 5 should be viewed together to understand how the retainer functions.

Two bi-directional seals 10 are held in the retainer 52 (two plates 54 and 56) and inserted into two flowline terminals 64 and 66.

To hold the bi-directional seals 10 in the retainer 52, each seal is provided with a peripheral centrally located radially opening groove 70 into which a split ring 72 is inserted. This split ring 72 cooperates with two steps 74 formed on the periphery of each bore 60 in the retainer plates 54 and 56 which, when brought together, form one groove for the split ring 72, thus holding each seal within the plates 54 and 56. These plates 54 and 56 are also provided with a pair of steps 76 on their outer periphery which, when the plates are brought together, form a groove to receive a radially inwardly directed profile 80 on a peripheral seal 82.

This peripheral seal 82 comprises, in addition to the profile 80, a pair of sealing elements 24a similar to the outer sealing elements 24, previously described, and a second radially outwardly directed profile 84 to be received as a pair of steps 86 formed in the flowline terminals 64 and 66 which, when brought together, form a groove. Thus, the peripheral seal 82 is held in place by the retainer and flowline terminals 66 and 66. These sealing elements 24a cooperate with peripheral grooves 90 in the flowline terminals and are oppositely facing so that when the seal assembly is brought between the two flowline terminals, the outer periphery is sealed against leakage in both directions. These sealing elements 24a also deflect and roll in the grooves 90 in the same manner as sealing elements 24 in counterbore 42. Finally, to complete the description of FIGS. 4 and 5, each terminal 64 and 66 is provided with counterbores 42 and guide surface 50 as previously described.

Under normal circumstances, when the flowline terminals are brought together, the fluid under pressure in the flowlines is sealed against leakage. This is represented by the solid line arrows 92. However, should one line pull a vacuum, or should leakage occur at one seal 10, then the pressure between the seals, being the higher pressure, would tend to flow into the other flowline. This flow is represented by the dotted line arrows 94. However, this flow is stopped by the second sealing elements 32 operating in a direction opposite to the first sealing elements 24 sealing the flowline against this possibility.

It should be apparent to those skilled in the art that considerable separation of the flow line terminals can be tolerated without leakage between the flowlines or out the peripheral seal due to the nature of these seals.

Figure 6:
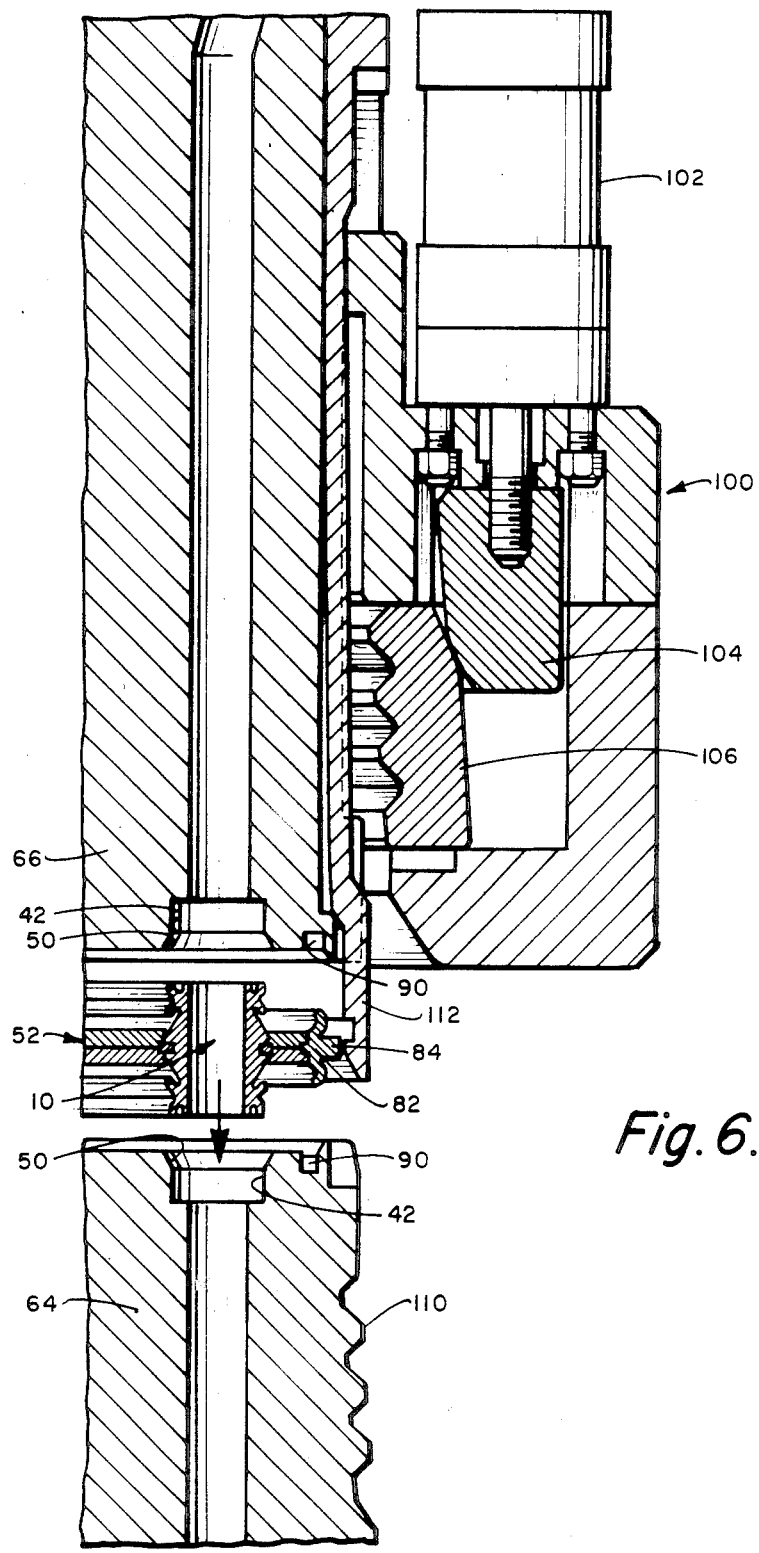
FIG. 6 and FIG. 7 illustrate the bi-directional seal of this invention as part of a cluster or assembly being inserted in a flowline.
Figure 7:
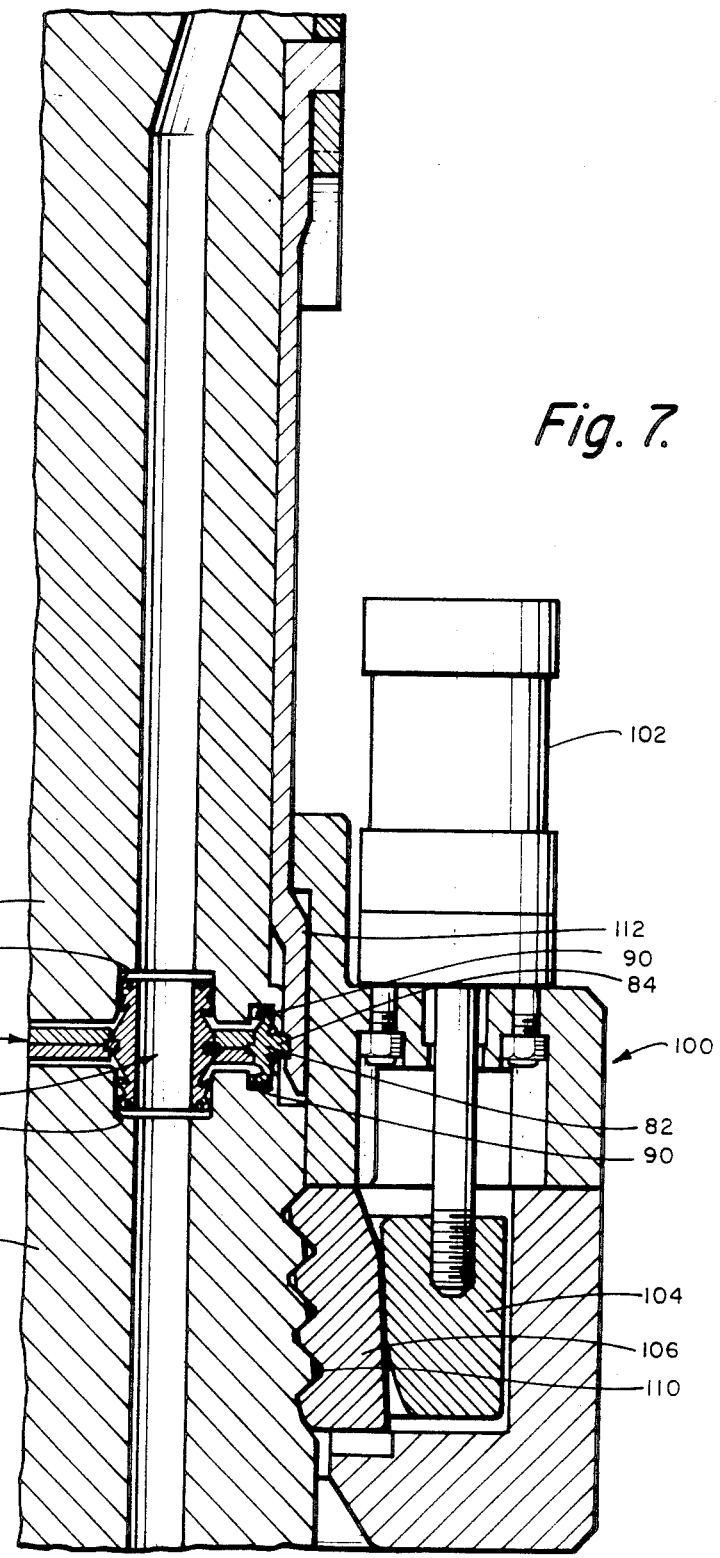

The next FIGS. 6 and 7 illustrate a seal assembly or cluster positioned between two facing flowline terminals with the appropriate number of metal-to-metal seals 10 and with the peripheral metal-to-metal seal 82 held in the retainer 52. The terminals are formed to reserve the metal-to-metal seals 10 and the peripheral metal-to-metal seal 82 as described in connection with FIG. 4 and need not be described further at this point. These Figures do show one example of the manner in which the flowline terminals are brought together, sealed, and connected. Thus, the cluster is first inserted into one of the terminals, such as 64. Thereafter, the other terminal 66 is brought into position to receive the other end of the metal-to-metal seals and when the faces of the two flowline terminals 64 and 66 are brought together, the clamping device 100 is actuated. As shown, the clamping device is located on the flowline terminal 66 and comprises a hydraulic actuator 102 which moves a camming ring 104 urging dogs 106 into a profile (grooves) 110 on the flowline terminal 64 to releasably connect the two flowline terminals together. It is to be noted that in the embodiments of the flowline terminals 64 and 66 shown in FIGS. 6 and 7, the steps 86 in the flowline terminals of FIG. 4 were omitted and replaced by a movable latch 112 to latch the profile 84 of the peripheral seal 82. This latch is functionally the same as the steps 86. In this manner the individual flowlines, terminating at their respective terminations, are isolated from each other and, in the event of the failure of any one flowline, the sealing elements of the other flowlines remain sealed against the leaking fluid in the manner discussed above.

Finally, it should also be apparent that only one pair of sealing elements such as 20 or 22 may be used with other types of seals where the design of the element to be sealed dictates such a change.

As stated before, these sealing elements are capable of being removed and reinserted for repair and maintenance without galling or scoring the walls against which the sealing elements react.

As an example of a typical seal constructed in accordance with this invention for a three inch flowline, the length of the ring is approximately 3.25 inches, the outer diameter of the two sealing elements on each end is approximately 4 inches to engage the cylindrical bore of approximately 3.995 inches to form the interference fit with the two sealing elements. The outer diameter of the ring in the thicker portion 16 is approximately 4.250 inches and the metal-to-metal seal itself is made of a low yield strength material such as 80 K material #4130.

I claim:

1. A metal-to-metal seal comprising a cylindrical ring having a bore therein and having bi-directional sealing elements on the outer periphery of said cylindrical ring, each bi-directional sealing element comprising,
   a first sealing element of flexible, springy metal, engageable in a cylindrical bore in interference fit relationship and, thus energized thereby, said first sealing element being of non-uniform thickness and having a curved outer surface and defining with said cylindrical ring a first cavity open toward a first flow path of fluid pressure so that said first sealing element is pressure assisted by said fluid pressure in said first cavity,
   said first sealing element having a maximum thickness in the area of said curved outer surface and having a lesser thickness in the area adjacent the end of said first sealing element where said cavity is formed,
   a second sealing element of flexible, springy metal also engaging said cylindrical bore in interference fit relationship and energized thereby, said second sealing element being of uniform thickness and adjacent said first sealing element and having a surface facing away from said first flow path of pressure fluid and defining with said cylindrical ring a second cavity energizable by fluid from a second direction in said second cavity to seal said flow path in two directions.

2. The metal-to-metal seal as claimed in claim 1 wherein said first and second sealing elements roll against said cylindrical surface as said sealing elements are made engageable in said cylindrical bore.

3. The metal-to-metal seal as claimed in claim 2 wherein both bi-directional sealing elements are integral with said ring.

4. The metal-to-metal seal as claimed in claim 1 further including a second bi-directional sealing element on the outer periphery of said cylindrical ring spaced from said first bi-directional sealing element, said first sealing element of this second bi-directional sealing element of flexible, springy metal engageable in a second cylindrical bore in interference fit relationship and, thus, energized thereby, said first sealing element of this second bi-directional sealing element being of non-uniform thickness and having a curved outer surface and defining with said cylindrical ring a third cavity open toward the flow path of fluid pressure which would react against said second sealing element of said first bi-directional sealing element so that said first sealing element of the second bi-directional sealing element is pressure assisted by the latter fluid pressure in said third cavity,
   said first sealing element of this second bi-directional sealing element having a maximum thickness in the area of the curved outer surface and having a lesser thickness adjacent the end of said sealing element where said third cavity is formed, and
   a second sealing element of this second bi-directional sealing element of flexible, springy metal also engaging said second cylindrical bore in interference fit relationship and energized thereby, said second sealing element of this second bi-directional sealing element being of uniform thickness and having a surface facing toward said first flow path of pressure fluid and defining with said cylindrical ring a fourth cavity energizable by fluid in said fourth cavity to seal said flow path in two directions.

5. The metal-to-metal seal as claimed in claim 4 wherein said first and second sealing elements of said second bi-directional sealing element roll against said second cylindrical surface as the latter sealing elements are made engageable in said second cylindrical bore.

6. The metal-to-metal seal as claimed in claim 4 further having means to connect said seal to a retainer for insertion into said first and second cylindrical bores.

7. The fluid seal as claimed in claim 6 wherein said sealing faces react against said cylindrical surface by a rolling action when pressed into said interference fit relationship.

* * * * *